US005246197A

United States Patent [19]

MacDonald

[11] Patent Number: 5,246,197

[45] Date of Patent: Sep. 21, 1993

[54] DRILL GUIDE AND SUPPORT THEREFOR

[76] Inventor: Stewart F. MacDonald, 2148 Beaumont Road, Ottawa, Ontario, Canada, K1H 5V3

[21] Appl. No.: 727,418

[22] Filed: Jul. 9, 1991

Related U.S. Application Data

[62] Division of Ser. No. 392,554, Sep. 28, 1989, Pat. No. 5,052,112.

[30] Foreign Application Priority Data

Feb. 21, 1989 [CA] Canada .................................. 591576

[51] Int. Cl.[5] .............................................. F16M 13/00

[52] U.S. Cl. ...................................... 248/689; 33/334; 248/231.7

[58] Field of Search .................. 248/231.8, 231.2, 689, 248/231.7, 225.31; 33/243, 334, 241, 263

[56] References Cited

U.S. PATENT DOCUMENTS

| | | | |
|---|---|---|---|
| 1,818,617 | 8/1931 | Grinwald | 248/231.8 X |
| 2,553,540 | 5/1951 | Beckerman | 33/243 |
| 2,806,296 | 9/1957 | Weichert | 33/334 |
| 3,052,036 | 9/1962 | Oliver | 33/334 |
| 3,500,545 | 3/1970 | Chivers | 33/241 |
| 3,906,640 | 9/1975 | Sosa . | |
| 3,946,493 | 3/1976 | Torres | 33/263 |
| 4,222,175 | 9/1980 | Bernicky | 33/263 |
| 4,238,098 | 12/1980 | Siegfried et al. | 248/231.8 X |
| 4,295,279 | 10/1981 | Sienknecht | 33/334 |
| 4,457,078 | 7/1984 | Suchy | 33/334 |
| 4,546,549 | 10/1985 | Duperon | 33/334 |
| 4,785,544 | 11/1988 | Heinsius et al. | 33/334 |

OTHER PUBLICATIONS

Brochure: Test Rite Precision Drill Guide Instructions.
Brochure: Stanley Drill Guide.
Brochure: Black & Decker Workmate Accessory Guidemate 79-015-04 Jul. 1978.
brochure: Black & Decker Owner's Manual-Drill Guide.

*Primary Examiner*—David L. Talbott
*Attorney, Agent, or Firm*—Jones, Tullar & Cooper

[57] ABSTRACT

An optical drill guide and a drill guide support for electric hand drills. The drill guide consists of a front sight aperture framed with a light color and a rear sight aperture formed by a translucent ring. The line of sight through the guide is arranged to be aligned with the longitudinal axis of the drill. The drill guide is used in conjunction with a mirror placed on the work surface so that when the guide is aligned a reflected image of the front sight surrounds the translucent ring. The guide is adapted to be integral with or detachable from the electric hand drill. When detachable, a drill guide support is provided which includes mounting means the ends of which are resiliently biased towards each other and adapted to be received in the housing of the drill to align the guide with the axis of the drill.

5 Claims, 3 Drawing Sheets

DRILL GUIDE AND SUPPORT THEREFOR

This is a divisional of copending application(s) Ser. No. 07/392,554 filed on Sep. 28, 1989, now U.S. Pat. No. 5052112.

FIELD OF THE INVENTION

A guide for the portable electric drill assists the operator in guiding the bit along the desired axis when drilling. Some guides will also assist in starting the hole, in limiting its depth, or in drilling into special shapes. The disadvantages of all known guides have greatly restricted their use and it is significant that none have been recommended for such routine uses as preventing the flexing and consequent breaking of small bits. The purpose of this invention is to provide a guide for the portable electric drill which may be either built into the drill housing or be detachable on it, and is sufficiently convenient and versatile to encourage habitual use.

DESCRIPTION OF RELATED ART

U.S. Pat. No. 3,906,640 (Sosa, 1975) teaches a pair of spaced sight openings on the drill housing (the rear one narrower) with their line of sight parallel to the axis of the spindle, and a mirror laid on or parallel to a flat work surface. When the images of the sights in the mirror are concentric the axis is normal to that surface.

The disadvantages of Sosa's guide are discussed below but it does have advantages which, as a group, distinguish it from all other drill guides. It can be used with any bit and without reducing the effective length (cf. Stanley Drill Guide, Black & Decker Drill guide). It is small and light enough to be built into the drill housing (cf. Black & Decker "Guidemate"). Sosa's detachable version need not be firmly attached to the housing (although his is) because it is not stressed in use. Further, its alignment is easily checked by using a "mirror and post" (cf. Sosa's "auxiliary reflector device"): a mirror laid on any flat surface from which a short rod projects at 90°. The use of the guide is not absolutely limited to drilling normal to a flat surface as implied by Sosa; for example, small workpieces may be held in a vise on the jaws of which the mirror is laid.

To supplement Sosa's plain mirror, the present invention provides a mirror fitted with a protractor capable of supporting it at any angle between 0° and ≧45° to a flat work surface. To drill at an angle $\alpha^\circ \pm \leqq 1^\circ$ to such a surface, the mirror is set at $(90-\alpha)^\circ$ to it. To position the mirror when the work surface is not flat, the drill may be held at the required angle with the bit at the point of entry while a plain mirror is attached to the work (e.g. with plasticine) so that the images of the sights are concentric. Alternatively, a "mirror and post" (with a longer and lighter post) is similarly attached (but without reference to the drill) with the post at the desired angle.

When built-in, Sousa's rear sight is necessarily obtrusive (and thus vulnerable) because it requires light from the front to make its image visible in the mirror. The present invention provides a rear sight-hole which is defined by a ring of translucent or transparent material and light from the side or rear then makes the image of the ring visible in the mirror. When the sights are built-in, the rear sight may then be buried in the housing like the front. Further, built-in or not, the sight holes may be the ends of a tube.

Sosa's detachable guide (like the Black & Decker "Guidemate") is mounted on an adjustable shoe which is held by a strap around the belly of the drill housing. Attaching and aligning are then awkward, more so because simultaneous, and the seating is unstable on some housings. "Portalign" and the Black & Decker Drill Guide are attached to the spindle of the drill, a feature common to all drills, which ensures that these guides can be attached to any drill and are self-aligning. However they too are awkward because the chuck must be replaced on the spindle by the guide, to which the chuck is then re-attached. They may also spin off if the drill is reversed.

SUMMARY OF THE INVENTION

In addition to the drill guide, the present invention provides a support which renders it instantly attachable/detachable and self-aligning on any drill housing which either has vent slots beside the fan has been adapted to the support. It is equally suitable for mounting tubular sights, Sosa's sights, or other unstressed guides like spirit levels. Here the tube whose ends represent the sights is adjustably mounted on a base which is fixed to the apex of a "bicycle pant" clip so the axis of the tube is normal to the general plane of the clip and may be adjusted about 1° in any direction. The clip sits over the housing with its ends modified to seat in the vent slots (if any) beside the fan, and is maintained in the plane of the slots by two legs which adjust to the width of the housing and seat in them. These legs are bolts which penetrate the clip about 1¼" from its ends and lie in its plane.

The axis of the spindle is substantially normal to the planes of the gears, of the fan, and of the vent slots beside it. It is thus substantially normal to the plane of the clip thus installed, and parallel to the axis of the sight tube. Consequently the guide is substantially aligned.

Should there be no vent slots beside the fan, the ends and legs of the clip seat in holes in two plastic pads (ca. 1¾×7/16×1/16") which are glued to the housing. These pads are initially located for gluing by setting up the drill with the guide and its support on a "mirror and post" (as for checking the alignment), with each unglued pad under an end and a foot. The pads etc. are moved as a unit on the housing until the concentric images of the sights show that the pads are in a correct position for gluing.

Attaching and detaching the detachable guide will not alter its alignment but the latter should be checked and corrected, by using the "mirror and post" to adjust the sight tube on its base, whenever a guide is installed on a drill for the first time, when it is transferred to another drill, and when maximum accuracy is required.

Thus in one aspect, the invention is a drill guide for use with a portable electric hand drill comprising a pair of apertured sights, the front sight having a light coloured face surrounding the aperture, the smaller rear sight aperture being framed by a translucent ring such that when in use a reflected image of the front sight and the translucent ring may be seen and aligned without the rear sight being open to forward illumination, both sights being adapted to be received on an electric drill such that the line-of-sight through said drill guide is substantially parallel with the longitudinal axis of a drill bit held in the drill.

In another aspect, the invention is a drill guide support comprising mounting means adapted to surround the top and both sides of a portable electric hand drill, each end of the mounting means being biased towards the other and including a foot and an arm, each of which is adapted to be releasably received as a close fit in an air vent in the plane of the fan of an electric hand drill, the mounting means being adapted to support a drill guide thereon in alignment with the axis of the spindle of the drill when the drill guide support is mounted on the hand drill.

In a further aspect, the invention is a drill guide support comprising mounting means adapted to surround the top and both sides of a portable electric hand drill, the housing having an unapertured surface, each end of the mounting means being biased towards the other and including a foot and an arm, each of which is adapted to be releasably received as a close fit in recesses formed in a pair of seating pads affixed to each side of the housing, the mounting means being adapted to support a drill guide thereon in alignment with the axis of the spindle of the drill when the drill guide support is mounted on the hand drill.

BRIEF DESCRIPTION OF THE DRAWINGS

Embodiments of the invention will be hereinafter described with reference to the following drawings, in which.

DESCRIPTION OF THE PREFERRED EMBODIMENTS

Figure 1:
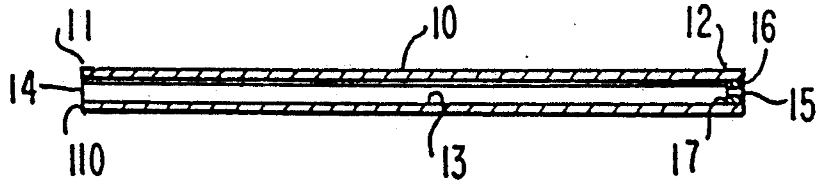
FIG. 1 is a longitudinal cross-sectional view of the optical drill guide element.

FIG. 1 shows one form of the drill guide in longitudinal cross-section. The guide consists of a tubular member 10 having a front sight 11 and a rear sight 12 which are coaxial. The inside wall 13 is preferably a dull black colour. The end 11*a* of the front sight 11 surrounding the circular opening 14 is a light colour preferably white. The rear sight aperture 15 is framed by short hollow cylinder or annulus 16 of clear or translucent material. The annulus may be located behind or within the rear sight 12. The openings may be of any convenient shape and need not be circular, but circular is preferred to permit easy alignment of two circles so as to be concentric, as will be later described.

Preferably, the tubular member 10 is formed of metal or rigid plastic and has a length of approximately four inches. A preferred inside diameter is approximately ¼ inch. The translucent annulus 16 may have an inner diameter of approximately 3/32 inch and an outer diameter of approximately ¼ inch. It may be formed of clear or translucent plastic tubing or the like.

Figure 2:
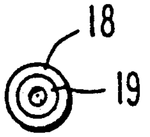
FIG. 2 shows the image of the sights when aligned.

When a user looks into the rear sight into a mirror surface resting on a plane to which the axis of the guide is normal, the user sees a pair of concentric light coloured rings as seen in FIG. 2. Ring 18 is the image of portion 11*a* of the front sight and ring 19 is the image of the annulus 16. Thus, the use of translucent material provides an image without requiring any frontal illumination of the drill guide. Frontal illumination would require the rear sight to be in an exposed and, hence, vulnerable position.

Figure 3:
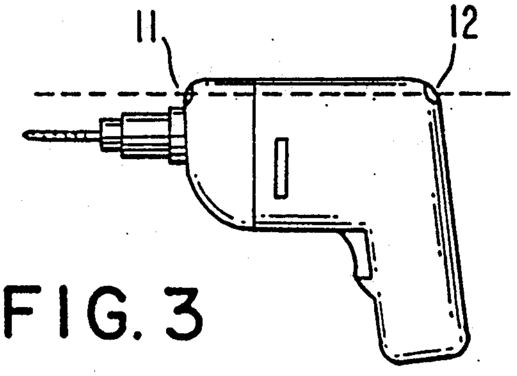
FIG. 3 shows a side view of a typical drill and the location of a built-in optical drill guide.

The drill guide of this design may be constructed integrally within the housing of an electric hand drill, as indicated diagrammatically in FIG. 3. In this case a free line of sight extends from the front sight 11 to the aligned rear sight 12 and there is no need for tubular member 10 (although one could be used) since the sights are supported by the drill housing. That is, the front sight 11 is formed in the housing and an unobstructed passageway extends to the rear sight 12, which supports an annulus 16 as described above.

The drill guide of the present invention may also be mounted to the surface of the drill housing with appropriate supporting and adhesive materials which may harden and hold the guide permanently in place. In such an arrangement the guide should be flat against the housing to minimize bulk. With this arrangement it is necessary to align the guide so as to ensure that the axis of the drill guide is parallel with the axis of a bit installed in the drill. One method of achieving this is to use a mirrored surface of suitable size with a post mounted at right angles. The post may be installed in the chuck of the drill and then the drill guide is installed to its final position when the images of the sights are concentric as shown in FIG. 2. Such a post with mirror is taught for example in U.S. Pat. No. 3,906,640 (Sosa).

Figure 4:
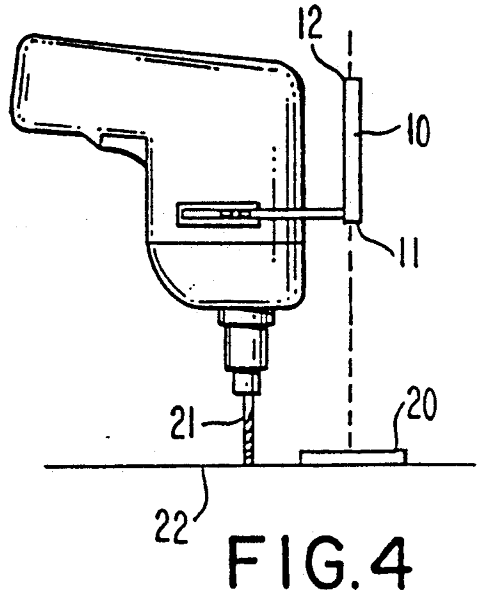
FIG. 4 shows, in side view, a typical electric drill with an optical drill guide and drill guide support drilling a hole at right angles to the workpiece.

When the drill guide is to be used to drill holes normal to a flat workpiece a plane mirror is employed with the guide. As may be seen in FIG. 4, mirror 20 is positioned flat on the workpiece adjacent the hole to be drilled. The drill bit is set at the correct location (or in a hole if necessary) and the user aligns the sights as described above. The user guides the drill while the hole is being drilled by holding the drill such that the circles in the reflected image, remain concentric.

Figure 5:
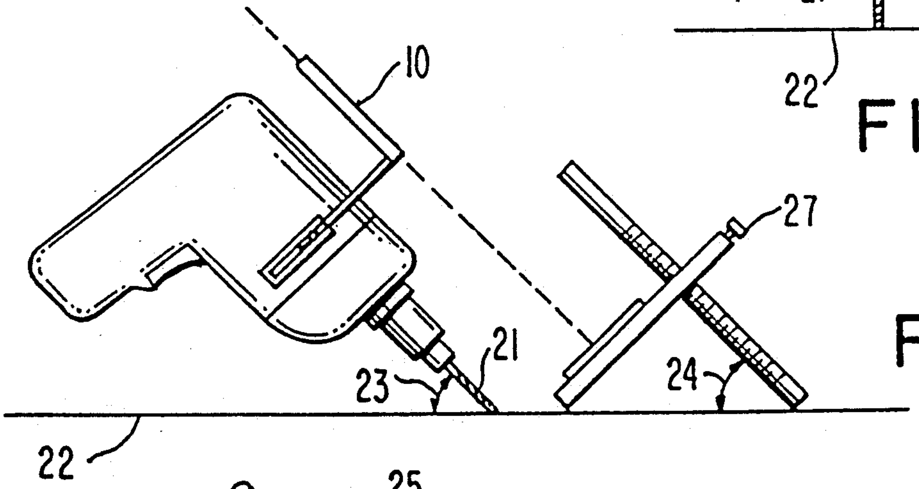
FIG. 5 shows, in side view, the arrangement for drilling a hole at less than 90° to the workpiece.

When the user wishes to drill a hole at an angle less than 90° to a flat workpiece a mirror mounted on a protractor may be used as shown generally at FIG. 5. As shown, the drill bit 21 is intended to enter the workpiece 22 at an angle 23, which is the same as angle 24 seen in FIGS. 5 and 6.

Figure 6:
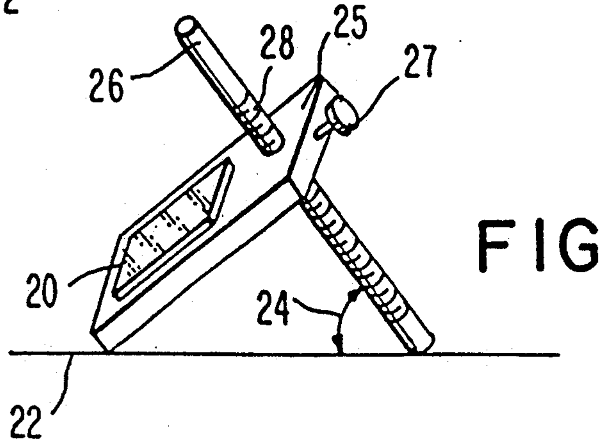
FIG. 6 shows a mirror and protractor useful with this invention.

The protractor is shown in FIG. 6 and comprises a plate 25 and a post 26 which is received in the plate 25 in slidable manner at right angles. The plate supports the mirrored surface 20. The post may be held in place by any means such as a set screw 27 and angle 24 varies according to the amount to which the post 26 penetrates the plate 25. When the post does not project through the plate, the angle 24 is 90° and angle 24 decreases as the post 26 projects further below the plate 25. It is desirable that the post include a scale 28 along its surface to give a direct reading of angle 24.

Thus, when the user wishes to drill a hole at an angle of less than 90° into a flat workpiece, the post 26 in the protractor is adjusted to the desired angle using the scale 28. The user then drills a shallow pilot hole at the desired location. This fixes the position of the hole. The user then sets the protractor as shown in FIG. 5 adjacent to the hole to be drilled so the plate meets the workpiece along a horizontal line to which the horizontal component of the axis of the hole is normal, and the images of the sights can be seen in the mirror when the bit is at roughly the desired angle. The user then uses the guide to align the drill until the circles of the sights appear concentric in the image reflected from the mirror, as discussed above. The user maintains the angle by using the guide as described until the hole has been drilled.

When the surface is not flat, the user makes the starting hole, holds the bit in it at the required angle, and supports the mirror with plasticine so the images of the sights are concentric, then drills the hole as previously described. Thus, the user may drill the desired hole in a controlled fashion.

Figure 7:
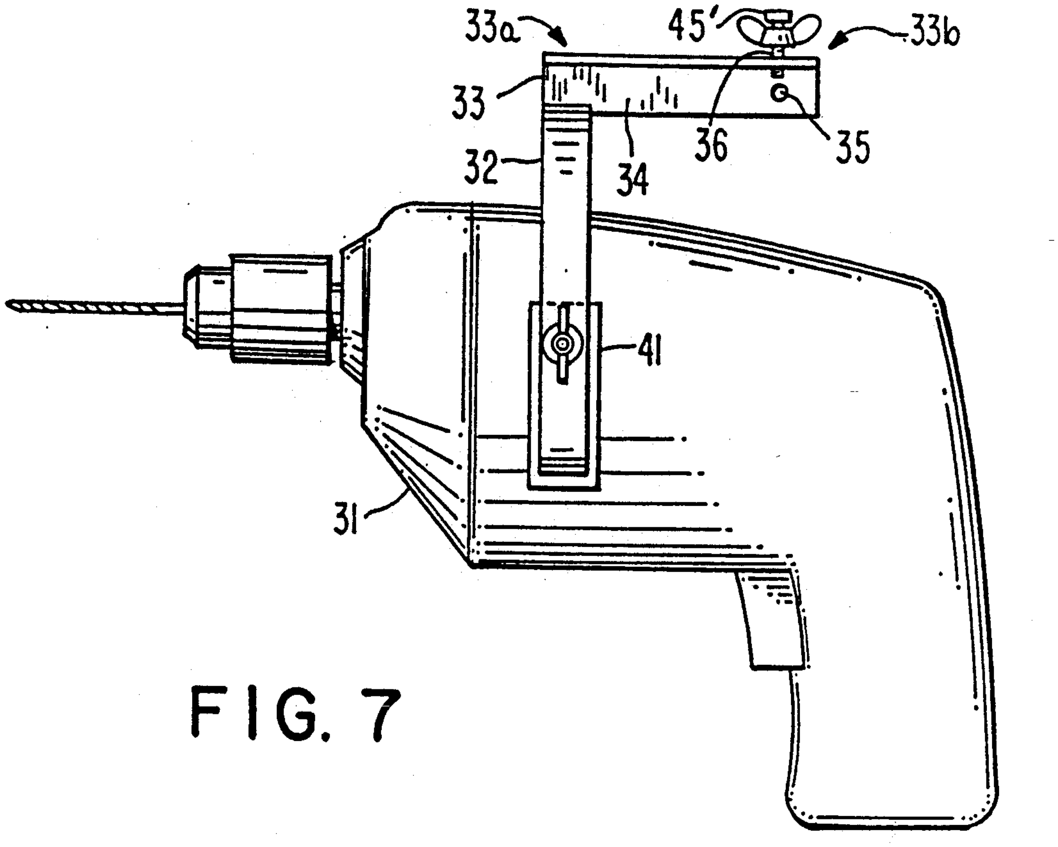
FIG. 7 is a side view of a typical electric hand drill with the drill guide support in place.
Figure 8:
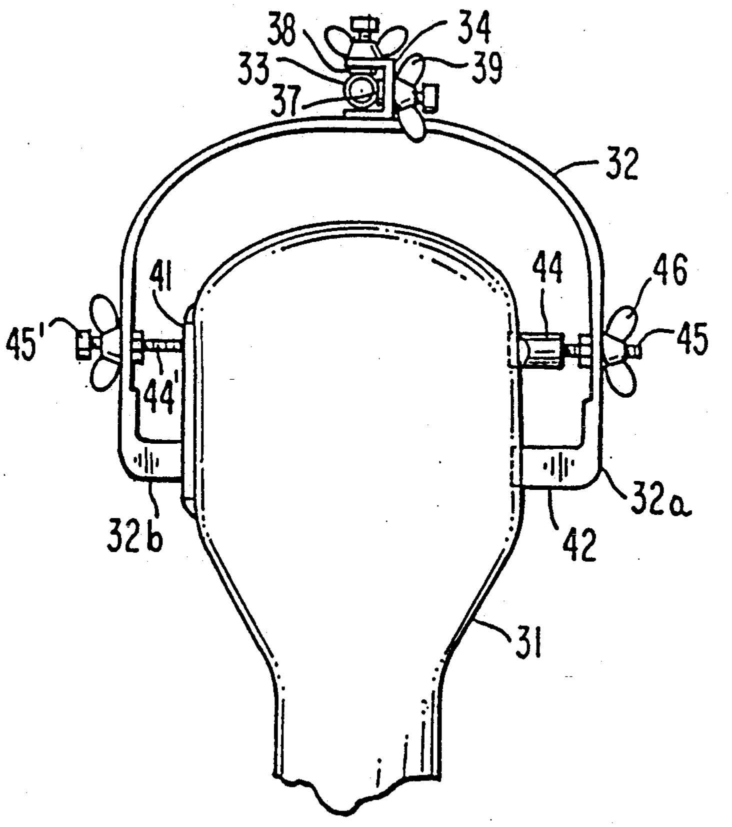
FIG. 8 is a front view of the detachable drill guide support and drill guide in place on the drill, showing at the left hand side the support received in a pad, and at the right hand side the support received in an air vent of the drill.

FIGS. 7 and 8 show a drill 31 with drill guide support installed thereon. The drill guide support comprises a mounting means or clip 32 the ends 32*a* and 32*b* of which are resiliently biased towards each other and thus towards the sides of the drill housing. The mounting means 32 may comprise a band of spring metal or other resilient material similar to a bicycle clip capable of providing sufficient force to bias the ends 32*a* and 32*b* towards each other and hold the drill guide and support in place during use and yet to allow easy removal by hand. The cross-section of the mounting means may be concave to resist out-of-plane deformation and assist in maintaining it engaged with the sides of the drill housing. The ends of the mounting means 32 may be received within appropriately positioned air vent slots if provided in the housing of particular electric hand drills. Support arms 44 and 44′ aid in providing stability in the mounted position.

If appropriate air vent slots are not available then special pads 41 may be attached to the drill housing to receive the ends of the mounting means, as described below. FIG. 8 is a composite to show the two modes of attachment, end 32*a* is shown engaging an air vent slot and end 32*b* engages a pad 41. Dealing first with end 32*a* engaging an air vent slot, it will be appreciated that the spindle of the drill will be found to be parallel to the axis of the fan and normal to the plane of the fan and the air vent slots. A distancing adjustment screw 45 is provided to be adjusted so that the end 42 and chisel shaped member 44 snugly contact the air slot in the drill housing, providing sturdy support. A locking nut or wing nut 46 maintains the distance of the arm from the mounting means once it has been set for the particular drill housing for which the support is adapted.

Figure 9:
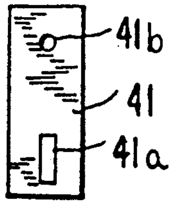
FIG. 9 shows a seating pad which may be attached to a drill housing to receive a detachable drill guide support.

In the absence of such slots, seating pads 41 may be applied to each side of the drill housing. As seen in FIG. 9, each seating pad includes a first recess 41*a* and a second recess 41*b*. First recess 41*a* is of a shape, shown in FIG. 9 as a slot elongated in a plane normal to the drill spindle, adapted to snugly receive a complementary shaped foot 42, identical to that used with the similarly elongated air vent slots, at the end 32*b* of the mounting means 32. The shape of the end of the foot 42 matches that of the recess 41*a* to provide snug engagement. In this case arm 44 consists only of the machine screw 44′ received in recess 41*b*. To aid in adjustment of screw member 44′ a knob 45′ is attached to its outer end for manual rotation.

The drill guide 33 is held in a support 34 affixed preferably at the apex of the mounting means 32, as shown in FIG. 8. The support 34 is a frame to support the drill guide 33 which may comprise a tube, as shown. The drill guide may be held reasonably rigidly at the front end 33*a*. The rear end 33*b* may be held in the support by elastic bands or a resilient spring so as to allow slight movement within the support 34. This is because slight adjustments of the order of 1° or less may be necessary when using different drills. The alignment of the sight may be adjusted within the sight support by means of a horizontal adjustment screw 35 and vertical adjustment screw 36 which are adapted to cause the rear end 33*b* of the drill guide to pivot laterally and vertically, respectively, about the front end 33*a*. The exterior portions of the tube which abut adjustment screws 35 and 36 are flattened so that the tube is stable when adjusted to any position.

The spring characteristic of the mounting means 32 provides sufficient pressure on the end portions 32*a* and 32*b* and arms in the recesses of the pads 41 against the side of the drill to hold the drill guide support in place. The four points of contact (namely, both pairs of feet and arms) ensure that the mounting means 32 is reproducibly aligned immediately upon installation.

When seating pads 41 are used, at the time of installation glue is applied and the seating pads 41 positioned in place on the housing of the drill. A mirror mounted on a surface with a post normal to the surface is installed in the drill, as taught by Sosa in U.S. Pat. No. 3,906,640. Alternatively the mirror and protractor device earlier described may be used. The mounting means are then installed over the drill by spreading apart the ends 32*a* and 32*b* and aligning the feet 42 with each recess 41*a* in the seating pads 41. The distancing adjustment screws 45 are adjusted so as to allow the machine screws 44′ to sit within recesses 41*b* and the locking nuts 46 are tightened so as to fix the position of the arms. Before the adhesive on the seating pads 41 is finally set, the final position of the seating pads is checked by ensuring that the drill guide 33 is parallel with the axis of the drill spindle (concentric arrangement of rings 18 and 19). This allows for final adjustments of the exact position of the seating pads 41 before the adhesive hardens. After the adhesive has set affixing the seating pads 41 in place, the mounting means 32 may be easily mounted and demounted from the seating pads. As can be seen in FIG. 8, pads 41 conform closely to the surface of the drill housing without projecting significantly and are not vulnerable to being displaced.

After the glue has hardened, any adjustment of the drill guide 33 within the support 34 may be accomplished by adjusting the horizontal adjustment screw 35 and the vertical adjustment screw 36 using a post and mirror as described above. This allows the accurate alignment of the sights to ensure that their axis is parallel with the spindle of the drill, and is generally necessary when the guide is transferred from another drill which is a different model. Once this adjustment has been made, the drill guide and support may be attached and detached as the user requires and further adjustment is not normally necessary.

Figure 10:
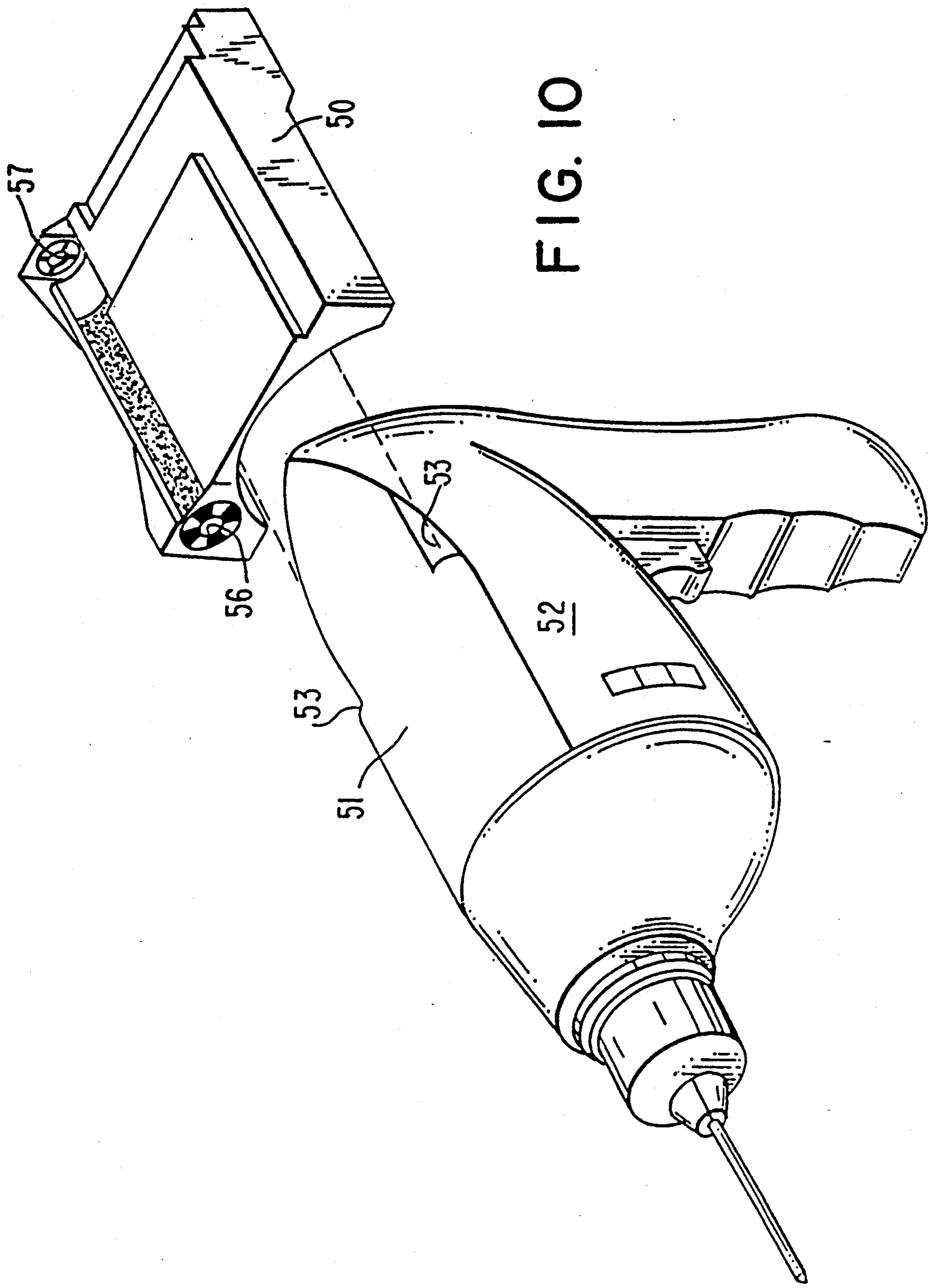
FIG. 10 is a perspective view of a drill guide support formed by a shoe located in position by engaging a defined feature on the drill.

Although specific examples of using existing features of drills, such as the apertured housing of FIG. 3, the apertures being provided by the air vents, to support the drill guide have been give, these examples are not exhaustive. Any surface feature which provides a stable, reproducible position can be used. For example, a sharply defined recess on the top surface of the drill housing can engage a corresponding projection on a moulded shoe; the shoe being held to the housing by spring biased arms similar to arms 32 but without any locating features. The bolt hole adapted to receive an auxiliary handle can be used for positioning such a shoe. Any such attachment is, of course, specific to a single drill model. As a different example of such a structure, FIG. 10 shows a shoe 50 contoured to fit the top surface 51 of a drill housing 52. The shoe is provided with pins on its under surface (not shown) which engage with bolt receiving recesses 53. The shoe has an open channel at one side forming a drill guide having forward and rearward sights 56 and 57.

It has been found in practice that the resiliency of the mounting means 32 is sufficient to hold the support in position so as to maintain the alignment of the guide to allow accurate drilling particularly where the cross-sectional shape of the support is concave or ribbed rather than rectangular. At the same time, because the drill guide support is held in place only by the biasing forces and not through any more permanent affixing means, the guide is easily and quickly attachable and detachable.

While only certain embodiments of the design have been illustrated and described, it is understood that these are presented by way of example only and variations will be clear to those skilled in the art. For example, the transparent annulus 16, could be formed by dipping the end of the tube into a liquid plastic and allowing it to harden. The disclosed drill guide support is capable of holding various kinds of unstressed sights. Not only could the sight previously described be used but the detachable sight taught in U.S. Pat. No. 3,906,640 (Sosa) could also be used with the detachable drill guide support.

I claim:

1. A drill guide support comprising mounting means adapted to surround the top and both sides of a portable electric hand drill housing, each end of said mounting means being biased towards the other and each including a foot and an arm which locate the mounting means on the drill housing, each said foot and arm being spaced apart and adapted to be releasably received as a close fit in an air vent which is one of several vents comprising elongated slots extending in the plane of the fan of an electric hand drill, said slots being in a plane normal to a spindle axis of the drill, both said foot and said arm being of a shape which is adapted to be snugly received in one of said elongated slots, said mounting means being adapted to support a drill guide thereon in alignment with said axis of the spindle of the drill but clear of the drill housing when the drill guide support is mounted on the hand drill.

2. A drill guide support as defined in claim 1 further including a horizontal adjustment screw and vertical adjustment screw adapted to adjust the alignment of the drill guide in relation to the orientation of the mounting mans support.

3. A drill guide support for mounting a drill guide in alignment with the axis of a portable electric hand drill having a housing with air vent slots, comprising:

a resilient spring clip means having a generally semicircular central band and first and second opposed ends, said central band being resilient so as to bias said ends toward each other, and toward engagement with the sides of said housing;

foot means on said first and second opposed ends for engaging said air vent slots of said drill housing, each foot means having a shape which is complementary to, and adapted to be received within, an air vent slot elongated in a plane normal to said axis; and adjustable arm means on said band adjacent each said foot means for engaging said air vent slots, said arm means being spaced from said foot means and including an elongated member also adapted to be received in a slot elongated in a plane normal to the axis, the resilience of the band being such as to hold the foot means and arm means in place in said vents while allowing easy removal, and wherein said foot means and said arm means provide the sole connection between the support and the drill housing and hold the support clear of the drill housing.

4. The support of claim 3, further including means secured to said band for adjustably mounting said drill guide on said support.

5. The support of claim 3, wherein said arm means is chisel shaped and is provided with an adjustment screw for adjustment towards or away from the clip means.

* * * * *